United States Patent
Castelnuovo et al.

(10) Patent No.: US 12,333,162 B1
(45) Date of Patent: Jun. 17, 2025

(54) POWER TEARING PROTECTION WITHIN A NON-VOLATILE MEMORY (NVM)

(71) Applicant: NXP B.V., Eindhoven (NL)

(72) Inventors: Andrea Castelnuovo, Hamburg (DE);
Alexandre Frey, Hamburg (DE);
Soenke Ostertun, Wedel (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/538,329

(22) Filed: Dec. 13, 2023

(51) Int. Cl.
G06F 3/06 (2006.01)

(52) U.S. Cl.
CPC ............ G06F 3/0626 (2013.01); G06F 3/064 (2013.01); G06F 3/0673 (2013.01)

(58) Field of Classification Search
CPC ....... G06F 3/0626; G06F 3/064; G06F 3/0673
See application file for complete search history.

(56) References Cited

U.S. PATENT DOCUMENTS

| | | | |
|---|---|---|---|
| 5,239,637 A * | 8/1993 | Davis ...................... | G11C 29/74 711/E12.019 |
| 7,313,648 B2 | 12/2007 | Lloyd | |
| 8,499,192 B2 | 7/2013 | Rousseau | |
| 2009/0150599 A1 | 6/2009 | Bennett | |
| 2011/0072300 A1* | 3/2011 | Rousseau ............... | G06F 3/0619 711/E12.001 |
| 2014/0310483 A1 | 10/2014 | Bennett | |
| 2015/0046670 A1 | 2/2015 | Kim et al. | |
| 2016/0344834 A1 | 11/2016 | Das | |
| 2016/0378820 A1 | 12/2016 | Marcotte | |
| 2018/0284995 A1 | 10/2018 | Dantkale et al. | |
| 2020/0097172 A1* | 3/2020 | Diaconu ................ | G06F 3/0619 |
| 2020/0104261 A1 | 4/2020 | Oh | |
| 2020/0218465 A1* | 7/2020 | Klein ................... | G06F 12/1009 |
| 2023/0315325 A1* | 10/2023 | Ostertun ............ | G11C 13/0059 711/154 |

FOREIGN PATENT DOCUMENTS

| | | | | |
|---|---|---|---|---|
| TW | I717856 B | | 2/2021 | |
| WO | WO-2006064318 A1 * | | 6/2006 | ........... G11C 16/102 |
| WO | 2015020811 A1 | | 2/2015 | |
| WO | 2019207285 A2 | | 10/2019 | |

* cited by examiner

*Primary Examiner* — Michael Krofcheck
(74) *Attorney, Agent, or Firm* — Joanna G. Geld

(57) ABSTRACT

A non-volatile memory (NVM) system includes a memory array divided into physical pages, control circuitry, and a global transaction log (GTL). Each physical page is configured to store a corresponding payload and corresponding metadata for the physical page. Each entry of the GTL is configured to store a transaction descriptor identifying a transaction and a corresponding physical page used by the transaction. Each entry also has a corresponding transaction log entry (TLE) flag. The control circuitry is configured to populate the entries of the GTL in sequential order with each new transaction, and, in response to completing storing the transaction descriptor for a new transaction, program the corresponding TLE flag by toggling its logic state.

16 Claims, 8 Drawing Sheets

FIG. 2

| TIME | TRANSACTION | NVM UPDATE | LUT UPDATE (VOLATILE) | LABEL |
|---|---|---|---|---|
| | n-1 | PAYLOAD (AND METADATA) | | ← 310a |
| | n-1 | TLE DESCRIPTOR | | ← 312a |
| | n-1 | | MAPPING | ← 314a |
| | n-1 | TLE FLAG | | ← 316a |
| | n-1 | MAP NEW PAGE | | ← 318a |
| | n-1 | UNMAP OLD PAGE | | ← 320a |
| | n-1 | META DATA | | ← 322a |
| | n-1 | FINALIZED FLAG | | ← 324a |
| PART a | n | PAYLOAD (AND METADATA) | | ← 330a |
| | n | TLE DESCRIPTOR | | ← 332a |
| | n | | MAPPING | ← 334a |
| | n | TLE FLAG | | ← 336a |
| PART b | n | MAP NEW PAGE | | ← 338a |
| | n | UNMAP OLD PAGE | | ← 340a |
| | n | META DATA | | ← 342a |
| | n | FINALIZED FLAG | | ← 344a |

FIG. 3A

| TIME | TRANSACTION | NVM UPDATE | LUT UPDATE (VOLATILE) | |
|---|---|---|---|---|
| PART a | n-1 | PAYLOAD (AND METADATA) | | ← 310b |
| | n-1 | TLE DESCRIPTOR | | ← 312b |
| | n-1 | | MAPPING | ← 314b |
| | n-1 | TLE FLAG | | ← 316b |
| PART b | n-1 | MAP NEW PAGE | | ← 318b |
| | n-1 | UNMAP OLD PAGE | | ← 320b |
| | n-1 | META DATA | | ← 322b |
| | | | | ← 324b |
| PART a | n | PAYLOAD (AND METADATA) | | ← 330b |
| | n | TLE DESCRIPTOR | | ← 332b |
| | n | | MAPPING | ← 334b |
| | n | TLE FLAG | | ← 336b |
| PART b | n | MAP NEW PAGE | | ← 338b |
| | n | UNMAP OLD PAGE | | ← 340b |
| | n | META DATA | | ← 342b |
| | | | | ← 344b |

FIG. 3B

POWER TEARING PROTECTION WITHIN A NON-VOLATILE MEMORY (NVM)

BACKGROUND

Field

This disclosure relates generally to a non-volatile memory (NVM), and more specifically, to power tearing protection in an NVM.

Related Art

In a non-volatile memory (NVM), if power loss occurs (due, e.g., to power tearing) while a write operation is in process, the state of the NVM may be lost or undefined. This may result in faulty or dangerous operation of any device using such NVM. For example, depending on a device's application, it may result in improper operation, loss of sensitive information, malfunction of safety operations, or the like. Tearing can also be intentional, such as by attackers trying to break security mechanisms by target power interruption. Therefore, to protect the contents of an NVM and provide additional security, power tearing protections need to be in place for those situations when a power supply cannot be guaranteed.

Typically, such anti-tearing approaches rely on using multiple atomic flags associated with each NVM memory page which identifies the completeness of a page update action. Note that an atomic flag is one which reliably results in a stable logic state (e.g. 0 or 1), or, in case of tearing, can be reliably strengthened to the correct stable logic state. Typically, multiple bit cells must be used to achieve the atomic behavior of an atomic flag. In current anti-tearing implementations, atomic flags are needed for every page in the NVM and thus the number of atomic flags is dependent on the number of pages in the NVM. However, each atomic flag is costly in area. Further, with the use of multiple atomic flags per page, multiple atomic flag updates are needed for each page update action, increasing the access time for a page. In addition, the greater the number of atomic flags, the greater the time and complexity required to strengthen or maintain these flags as they become weak or shaky. Therefore, a need exists for improved power tearing protection.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates, in table form, contents of a GTL over time in accordance with one embodiment of the present invention.

FIGS. 3a and 3b illustrate, in table form, sequential steps of example page update transactions over time.

DETAILED DESCRIPTION

Tearing protection for an NVM ensures that the content of the NVM is robust, even in the case of a tearing event in which power is lost during operations with the NVM. That is, a tearing event is any event (intentional or not) which results in loss or disruption of power. In one aspect, an anti-tearing approach for an NVM is implemented using a global transaction log which stores metadata information related to each ongoing content update transaction being performed on the NVM and protects the stored information with an atomic flag. In this manner, rather than using an atomic flag (or multiple atomic flags) for each block (e.g. page) of the NVM to protect metadata associated with each NVM block, only one atomic flag is needed for each transaction in the log thus the number of atomic flags is dependent on the size of the transaction log rather than the NVM. Each atomic flag is costly with respect to area, therefore, it is desirable to reduce the number of required atomic flags. Atomic flags also need to be properly maintained or strengthened. In the former example, all of the atomic flags used for each block of the NVM need to be strengthened or maintained, increasing required cost and complexity. However, with the global transaction log, maintenance of the atomic flags can be simplified.

Figure 1:
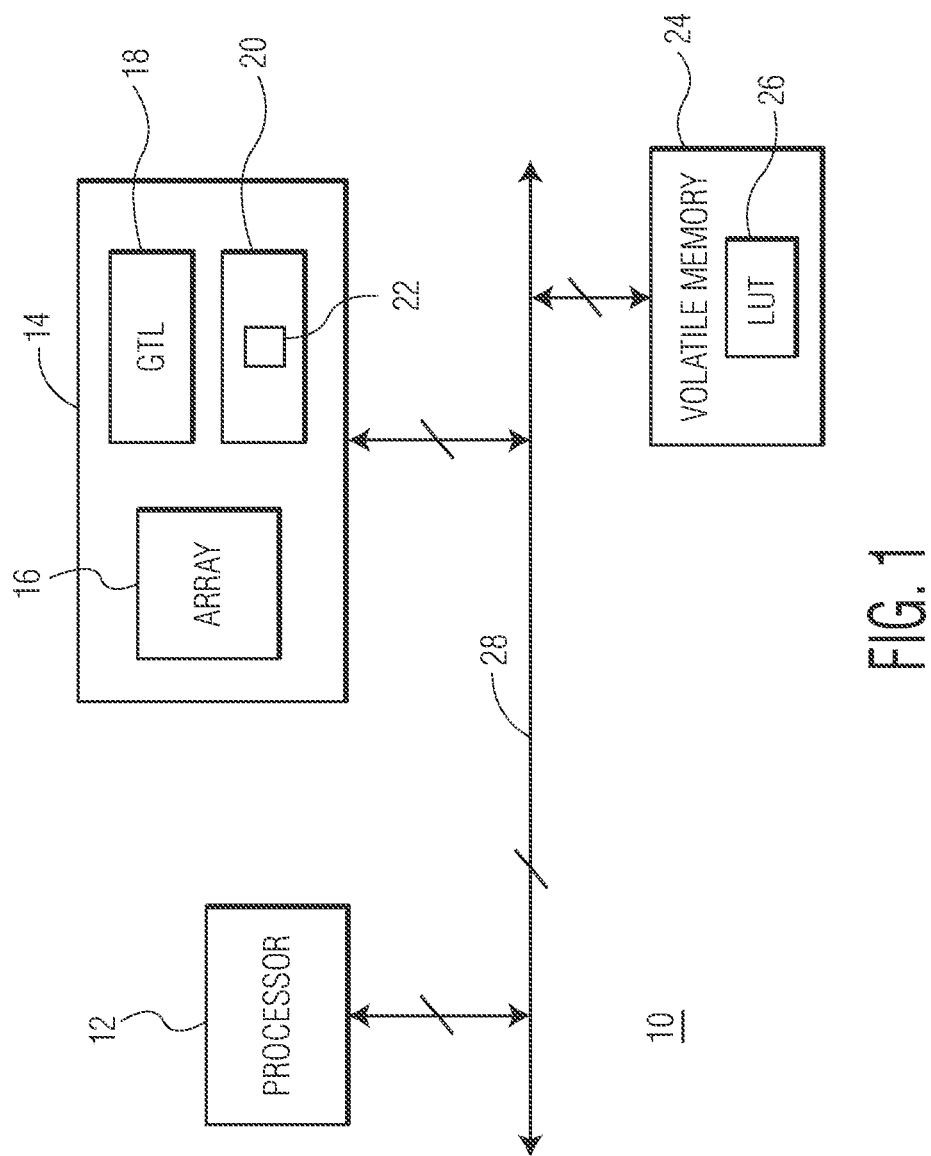
FIG. 1 illustrates, in block diagram form, a data processing system including a non-volatile memory (NVM) and an associated global transaction log (GTL), in accordance with one embodiment of the present invention.

FIG. 1 illustrates a data processing system 10 including a processor 12, a non-volatile memory (NVM) 14 (which may also be referred to as an NVM system), and a volatile memory 24 coupled to a system interconnect 28. Data processing system 10 may correspond to any type of device used in different types of applications, such as in automotive applications, smart cards, etc., and may therefore be referred to as a device. In one embodiment, data processing system 10 may be implemented as a system on a chip (SoC). Volatile memory 24 can be any type of volatile memory such as, for example, a static random access memory (SRAM). NVM 14 includes a memory array 16 which may be divided into a plurality of memory blocks (referred to herein as pages or physical pages), a global transaction log (GTL) 18, and control circuitry 20 (also referred to as controller 20). Controller 20 includes exception registers 22. GTL 18 may also be referred to simply as log 18. GTL 18 is associated with NVM 14 and may be stored in storage circuitry which is a part of memory array 16 or which is separate storage circuitry in NVM 14 external to array 16. Note that, in alternate embodiments, GTL 18 can instead be stored in a separate memory (e.g. a separate NVM) from NVM 14. NVM 14 can be implemented as any type of NVM, such as, for example, a resistive random access memory (RRAM), a magnetoresistive random access memory (MRAM), flash, electrically erasable programmable read-only memory (EEPROM), etc. System interconnect 28 can be any type of interconnect such as, for example, a bus, cross-bar switch, fabric, etc. In alternate embodiments, data processing system 10 may be referred to as a memory system, which includes NVM 14, controller 20, and GLT 18, in which GTL 18 can be internal or external to array 16 or can be external to NVM 14. Controller 20 controls accesses to array 16 and also control accesses to GTL 18 (e.g. controls updating entries of GTL 18). In alternate embodiments, separate controllers may be implemented for accesses to each of array 16 and GTL 18.

Array 16 of NVM 14 is divided into a plurality of pages. Each physical page is configured to store a corresponding payload (PL). In addition to the payload, each physical page has corresponding mapping information which includes a logical address (LogicalAddr) which maps to the physical page as well as a corresponding non-atomic mapping flag (MUF) which indicates the status of the mapping (i.e. whether the physical page is mapped or unmapped). Each MUF is a non-atomic flag which may be implemented as a single bit which, when asserted, indicates the page has been mapped, and when negated, indicates that it has not been mapped. Non-atomic flags are susceptible to tearing events which may result in the value of the flag being indeterminate, and thus no longer valid or correct. The mapping information and the MUF may be considered as metadata of the physical page, in which the metadata may include additional corresponding information (e.g. count values, error correction codes, etc.). Although the metadata is logically linked to a physical page, it may not be stored in the same physical memory page. That is it can either be stored in the same physical memory page or elsewhere within NVM 14.

In performing logical page updates in NVM 14, each logical page of information (including the payload and corresponding metadata) is updated in a different physical location so that the old information is maintained until the new information is confirmed to be fully written. The old information can be maintained by, for example, writing a new physical page with the updated information. However, while writing the new information, both the old information and the new information belong to the same logical memory block (i.e. both the old page and new page are mapped to the same logical address). Once the MUFs of the old page and new page are properly updated, they can be used to distinguish between the old information and the new information. However, if the MUFs are unreliable, such as due to a tearing event, it is not possible to properly discriminate between the old information and the new information. Therefore, to maintain proper operation, it is necessary to discriminate between the old information and the new information, even after occurrence of a tearing event, in which the selection between the old and new information is always consistent. That is, at any given time, only one of the old page or the new page should be indicated as valid, and once the old page becomes invalid, it should not come back up as valid after the tearing event.

In one embodiment, the discrimination between the old and new information is enabled for NVM 14 through the use of GTL 18 to keep track of any single ongoing transaction. Each transaction log entry (TLE) of GTL 18 is configured to store a TLE descriptor for a transaction (i.e. a page transaction), in which the descriptor identifies the type of transaction (e.g. with an opcode) and provides mapping information between logical and physical addresses. The descriptor may include any number of parameters, as needed, for the page transaction (such as the physical addresses of pages involved in the page transaction). In some embodiments, one of the parameters also includes the logical address for the page transaction. The descriptor may also include additional information for the transaction, depending on the type of transaction. Each TLE of GTL 18 also has a corresponding TLE flag, in which each TLE flag is implemented with an atomic flag. With each new transaction for NVM 14, a next entry of GTL 18 is filled, and when the corresponding atomic TLE flag is programmed for the entry being filled, all information in the TLE descriptor of that entry is considered stable and not subject to maintenance, thus guaranteeing a consistent mapping between physical and logic pages. The TLE flags of GTL 18 can then be used to identify the last transaction entry (LTE) of GTL 18 during a boot sequence after a power loss, in which the LTE stores the latest transaction whose corresponding TLE flag was programmed prior to the power loss. The mapping information stored in the identified LTE can then be used in addition to the metadata (e.g. MUFs, logical addresses) stored in the physical pages of NVM 14 to generate an accurate mapping table for all pages of NVM 14, even after a tearing event.

Therefore, note that each page of array 16 includes a corresponding non-atomic MUF, but not a corresponding atomic TLE flag. In this manner, an atomic flag is not needed for each page of array 16, but only for each entry in GTL 18. Therefore, fewer atomic flags than non-atomic flags are required to securely implement NVM 14. As will be described in more detail below, the atomic TLE flags in GTL 18 provide sufficient information to differentiate between new and old pages upon a page update, even if a tearing event results in the MUFs of the old and new pages to not be correct or valid.

As described above, each entry of GTL 18 stores a corresponding atomic flag. The atomic flag can be programmed to a logic state by setting it to a logic level one or clearing it to a logic level zero. As used herein, an "atomic flag" refers to a flag which is programmed (i.e. set or cleared) in a reliable manner without the risk of a tearing event resulting in uncertain pseudo-random flag values. That is, an atomic flag has two stable states and transition states between the two table states which, after a tearing event, can be reliably detected and brought to one of the stable states. As such, for an atomic flag, a weakly cleared or weakly set flag, which may incorrectly be read as a logic one or zero, respectively, in a pseudo-random manner, should reliably be detected as being weakly programmed (i.e. weakly cleared or weakly set, respectively) and should then be capable of being accurately strengthened so as to be strongly programmed (i.e. strongly cleared or strongly set, respectively). During the strengthening process, though, a strongly cleared or strongly set flag should not be altered to its opposite value.

In one embodiment, an atomic flag may be implemented using multiple bit values (i.e. multiple non-atomic flags or multiple memory cells), in which a memory controller may need to execute a number of different sequential operations to either set or clear the atomic flag. In one example, an atomic flag is implemented using 2 memory bits, capable of providing four states (0-0, 0-1, 1-0, and 1-1), also referred to as conditions. The states can be defined as follows: 0-0 indicates the atomic flag is in an invalid or uninitialized state, 0-1 indicates the atomic flag is cleared (i.e. a logic level 0), 1-0 indicates the atomic flag is set (i.e. a logic level 1), and 1-1 indicates the atomic flag is unknown (i.e. "X"). During operation, controller 20 performs a sequence of operations to either set or clear the flag. For example, to set the flag, controller 20 is configured to set each memory cell of the pair of memory bits sequentially so that a first memory cell of the pair of memory bits is fully programmed (i.e. set to a condition associated with an analog value, such as voltage, current, or resistance, associated with the desired set or cleared state) before controller 20 modifies the second memory cell of the pair of memory bits. Note that even though controller 20 may execute a number of sequential operations to either set or clear the flag, this flag is considered "atomic."

Therefore, in the above example, when programming the atomic flag, the bit which is 0 is first set to a 1, followed by clearing the other bit to 0. In this manner, setting an atomic flag includes updating the pair of memory bits from 0-1 to 1-0, in which this is performed with the following series of operations (steps): 0-1←x-1←1-1←1-x>1-0. That is, first, the 0 bit (i.e. the first bit of the pair of bits) is set to a 1, and next the 1 bit (i.e. the second bit of the pair) is cleared to 0. Similarly, clearing an atomic flag includes updating the pair of memory bits from 1-0 to 0-1, in which this is performed with the following series of operations (steps): 1-0←1-x>1-1←x-1←0-1. Again, first, the 0 bit (i.e. the second bit of the pair) is set to a 1, and next the 1 bit (i.e. the first bit of the pair) is cleared to 0. Alternatively, a clear before set ordering can be implemented in which the bit which is 1 is first cleared to 0, followed by setting the other bit to 1. In this alternate embodiment, 1-1 may indicate the invalid or uninitialized state and 0-0 may indicate the atomic flag is unknown.

If the programming of the atomic flag is interrupted (torn) as a result of a tearing event, just one of the pair of memory bits might be in an uncertain condition (i.e. x) as the other bit of the pair of memory bits only gets updated once the first update completed successfully. When reading the value of the atomic flag, the "x" state of a memory cell may be read as either a 0 or a 1 value, depending upon whether the memory cell's value is read as being above or below the cell's threshold value. Therefore, the potential shaky conditions in case of tearing are when the pair of bits are at x–1 or 1-x, which can either be read as 0-1 or 1-0, respectively, or read as 1-1.

If controller 20 reads an atomic flag as x–1 as 0-1, controller 20 will interpret the atomic flag as being in its clear state (i.e. logic level 0). This is correct, as the tearing event happened during the first step (e.g. 0-1 to x–1) of a flag set operation or during a second step (e.g. x–1 to 0-1) of a flag clear operation. If controller 20 reads 1-x as 1-0, controller 20 will interpret the atomic flag as being in a set state (i.e. logic level 1). This is correct, as the tearing event happened during the second step (e.g. 1-x to 1-0) of a flag set operation or during the first step (e.g. 1-0 to 1-x) of a flag clear operation. Also, if controller 20 reads x–1 as a 0-1 or 1-x as a 1-0, these shaky conditions (corresponding to a weak flag) can be strengthened to a clean 0-1 or a clean 1-0, respectively, by clearing or setting the memory cell of the pair from "x" to 0 or 1, respectively.

However, if either condition x–1 or 1-x is read as 1-1, controller 20 determines the atomic flag as being in an unknown state. This condition indicates the occurrence of a tearing event since the 1-1 condition can only occur if a tearing event interrupted the programming operation. Therefore, if read as a 1-1, the state of the bits needs to be consistently resolved, in which various methods may be used to implement its resolution. In one example, controller 20 can implement a margin check to determine which memory cell of the pair is the weaker bit, and clearing that bit to 0, so that the pair of bits is read as either 0-1 or 1-0. The weaker bit is the memory cell of the pair which has a read signal (e.g. read voltage or read current) that is closer to the memory cell's threshold value.

Therefore, in this manner, an atomic flag will always be reliably read as being set (to a logic level 1) or cleared (to a logic level 0), even with the occurrence of a tearing event during programming of the atomic flag resulting in one of the pair of bits of the atomic flag being in the "x" state. That is, the occurrence of a tearing event does not result in uncertain pseudo-random flag values. Note that in alternate embodiment, each atomic flag can be implemented with a higher number of bits, greater than just two bits. Some implementations of atomic flags are described, for example, in US Publication No. 20230315325A1. However, other implementations of an atomic flag may be used.

Note that in contrast to an atomic flag, which may require multiple memory bits to implement and multiple operations to program, a non-atomic flag may be implemented with a single memory bit (in which the single memory bit is capable of being a logic level one or logic level zero). However, if a tearing event occurs during writing a non-atomic flag, the resulting value can be indeterminate. Also, note that setting or clearing a non-atomic flag can be done with one operation, while the setting or clearing of an atomic flag, as described above, may require multiple operations. Further, as described above, atomic flags require maintenance to ensure that the atomic flag securely maintains its state. In this manner, atomic flags which are determined to be weakly programmed can be strengthened to be strongly programmed.

Figure 2:
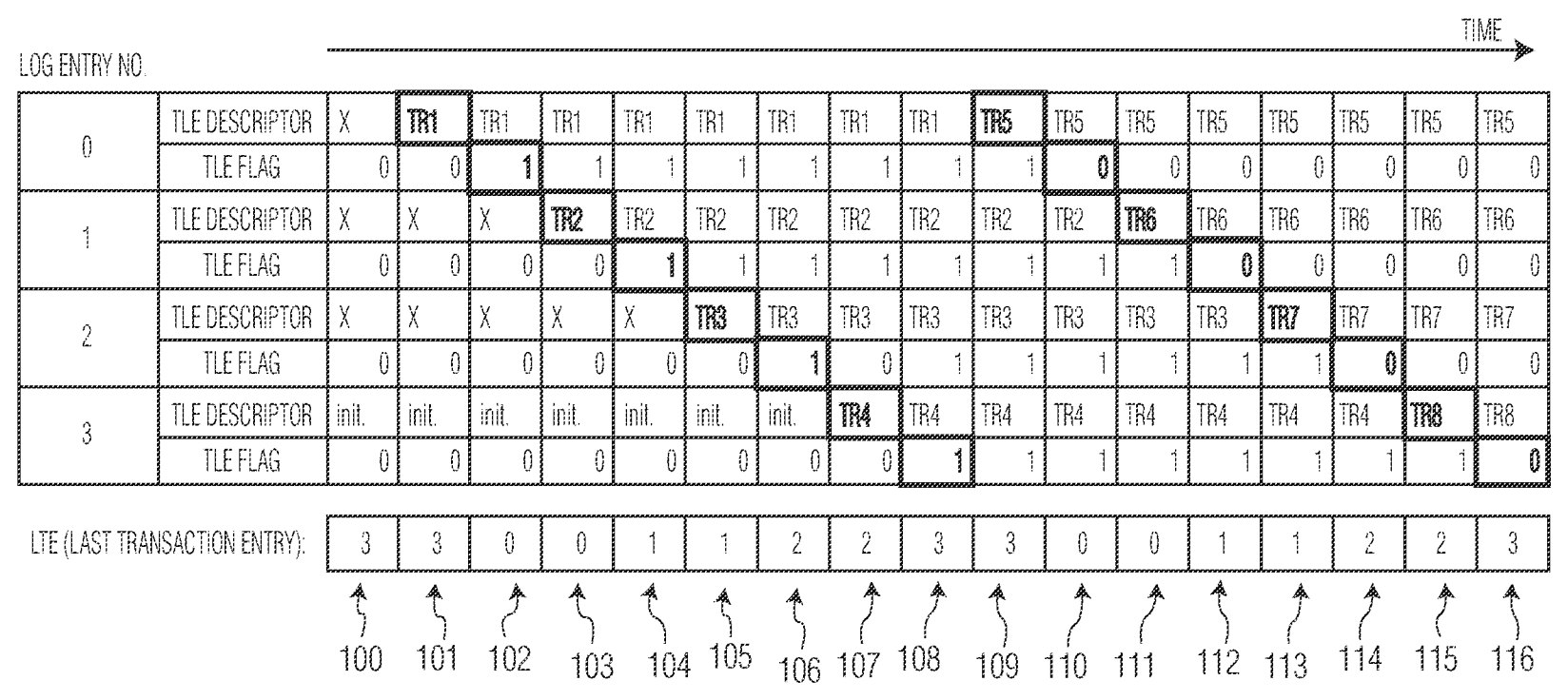

FIG. 2 illustrates, in table form, GTL 18 in accordance with one embodiment of the present invention. GTL 18 keeps track of the single ongoing transaction, in which only one transaction can occur at a time. Each entry of GTL 18 is configured to store the descriptor for a transaction and the corresponding TLE flag (implemented as an atomic flag). In the illustrated embodiment, each TLE flag is illustrated as either being a logic one or logic zero, reflecting the atomicity of being reliably resolved to one state or the other. That is, the state "x" may occur due to a tearing event during the flag update, as was described above, however, it is assumed that this situation can be reliability detected and resolved at system startup (during a boot sequence) when scanning GTL 18 for the LTE (including eventual strengthening of the LTE flag).

FIG. 2 illustrates how GTL 18 gets updated over time for 8 consecutive transactions (TR1-TR8). For each transaction, the TLE descriptor of an entry is updated before the corresponding TLE flag is toggled to mark the entry as being valid. A tearing event during the descriptor update will not result in harm as the entry will not be used (will not be considered reliable for use) until the TLE flag is toggled. A tearing event during update of the TLE flag is also not problem since the TLE flag update is atomic. Note that each transaction results in toggling only one TLE flag.

In the illustrated embodiment, each transaction within GTL 18 is identified by TRn, in which "n" is an integer value, greater than zero, to differentiate between transactions. As will be described in more detail below, each transaction may refer to a memory transaction or a page transaction (also referred to as a page operation), such as, for example, a page update transaction, an allocate page transaction, a release page transaction, or any other available page transaction. The descriptor for a transaction may also be referred to as the command for a transaction and may include a corresponding opcode for that command. The illustrated embodiment includes only four transaction entries (identified, from top to bottom, as log entry 0-log entry 3, also referred to as entry 0-entry 3 or TLE 0-TLE 3, in which the values of 0-3 may be referred to as the indices of the entries). Each entry includes a TLE descriptor portion configured to store a corresponding TLE descriptor for a transaction and a corresponding TLE flag. Each column of columns 110-116 illustrated in FIG. 2 corresponds to example contents of entry 0-entry 3 at different points in time as time increases from the left column (column 100) to the right column (column 116). Since each column corresponds to a time, column 100-column 116 may also be referred to as time 100-time 116, respectively, in which the times need not represent time slots of equal duration (i.e. they need not be equally spaced in time).

In one embodiment, the TLE flags are all initialized to zero. Alternatively, they may be initialized to one. In the illustrated embodiment, all TLE flags were initialized to zero, therefore, at time 100, the TLE flag of each of entries 0-3 is zero. At time 101, a first transaction TR1 is initiated (e.g. by processor 12). The descriptor for TR1 is written into the descriptor portion of entry 0. After the descriptor is fully written (fully programmed into entry 0), the corresponding TLE flag is toggled (in this case, set to a logic 1 since it was a logic 0). Therefore, at time 102, the TLE flag of entry 0 is set to a logic 1. Similarly, at time 103, a second transaction TR2 is initiated, and the descriptor for TR2 is written into the descriptor portion of entry 1. After the descriptor is fully written, the corresponding TLE flag is toggled (set to a logic 1 at time 104). Therefore, for each new transaction, a next sequential entry of GTL 18 is populated by first writing the descriptor into the descriptor portion of the entry, and once that is complete, toggling the corresponding TLE flag. As will be described in more detail below, each transaction tracked by GTL 18 includes two parts: part a) the update (e.g. programming the payload and metadata in the NVM, and programming an entry of the GTL), and part b) the finalization (e.g. the updating of the MUFs in the NVM). The corresponding TLE flag is toggled between the two parts, in which the update portion of the transaction is not confirmed (i.e. considered complete) until the corresponding TLE flag is toggled. In this manner, each transaction may be described by the sequence of: part a, update of the TLE flag, then part b. In one embodiment, the logical address is updated in the NVM in part a, as part of programming the metadata. However, in an alternate embodiment, the logical address is instead updated in part b as part of the finalization, along with updating the MUFs in the NVM. In this alternate embodiment, though, the logical address is stored as part of the programmed entry of the GTL in part a.

Still referring to FIG. 2, when a tear occurs, the last transaction entry (LTE) of GTL 18 identifies which transaction was in progress when the tear occurred. More specifically, the LTE corresponds to the last valid entry which was confirmed but not yet finalized. The LTE can be identified, after a tearing event, by determining a discontinuity in the TLE flags because this determines the last transaction whose corresponding TLE flag was toggled (thus confirming the transaction). In FIG. 2, underneath each column, the corresponding LTE is provided assuming a tearing event occurred at that time. For example, if a tearing event occurred at time 104, the LTE is identified as entry 1 because, at that time, there is a discontinuity in TLE flags between entry 1 (TLE flag=1) and entry 2 (TLE flag=0), which can be found with a scan of the TLE flags in that column from top to bottom. Therefore, TR2 has been confirmed but not yet finalized. If a tearing event occurred a bit later, such as at time 105, the LTE would also be identified as entry 1 because the discontinuity in TLE flags is still between entry 1 and entry 2. Even though TR3 was also started at time 105, it was not yet confirmed (as its corresponding TLE flag was not yet toggled). A tearing event at time 106 or 107 would result in the LTE being identified as 2 due to the discontinuity occurring between entries 2 and 3 at either of these times. Since an identified LTE is known to be confirmed, the TLE descriptor of the LTE is known to be reliable. Determination and use of the LTE flag after a tearing event will be described in more detail below. (Also, in the last entry of GTL 18, corresponding to entry 3 in the illustrated embodiment of FIG. 2, "init." indicates that the TLE descriptor value has been initialized and is therefore valid, such as to indicate a "no transaction command." In this manner, entry 3 is a valid entry if indicated as the LTE.)

Note that in the example of the TLE flag implemented with multiple bits, toggling the logic state of the TLE flag requires a series of operations to transition from one state to the other, as described above. However, even with the occurrence of a tearing event during the toggling of a TLE flag, the TLE flag will be consistently read or resolved to a stable state.

Note that GTL 18 is filled sequentially with each new transaction, in accordance with the logical order of the entries, and is updated in only one direction (e.g. entry 0 to entry 3, or top to bottom in the illustrated embodiment). Each time a new transaction is started and utilizes a next available entry of GTL 18, note that the previous entry (created in response to the previous transaction) is considered invalidated. In this manner, GTL 18 only includes one valid entry at a time. In the illustrated embodiment, the entries of GTL 18 are filled sequentially in accordance with increasing index values (e.g. entry 0, then entry 1, then entry 2, then entry 3). In the illustrated embodiment, GTL 18 is implemented as a rolling log, in which the entry which is sequentially filled after entry 3 rolls back to entry 0. (Alternatively, the entries of GTL 18 can be filled sequentially in accordance with a different logical ordering of the entries, such as in accordance with decreasing index values.) In the illustrated embodiment, once GTL 18 is full (and therefore rolls back around to entry 0 for a new transaction), the direction of the TLE flag toggling will be inverted (e.g. change from toggling from 0 to 1 to toggling from 1 to 0 or vice versa). For example, once every entry of GTL is filled sequentially from the beginning entry to the last entry, with the corresponding TLE flags toggled (programmed) by being flipped in one direction, filling GTL 18 wraps around back to the beginning entry and the corresponding TLE flags are toggled (programmed) by being flipped in the opposite direction. This avoids special maintenance of the TLE flags as a result of a necessary clear-all-TLE flags (or set-all-TLE flags) operation which would be needed but might itself suffer from tearing. In one embodiment, the filling in of the next sequential entry and the toggling of the TLE flag can be performed by controller 20. Also, although only 4 entries are illustrated, GTL 18 can include any number of entries.

FIGS. 3*a* and 3*b* illustrate, in table form, example logical page update transactions in further detail. As discussed above, each transaction "n" includes an update portion (part a), updating a corresponding TLE flag, and a finalization portion (part b). Referring first to FIG. 3*a*, the rows are labeled, from top to bottom, 310*a*-344*a*, in which each row includes a sequential step of the page updating transaction occurring in increasing order of time from top to bottom (in which each row can take different amounts of time, as needed). The bold line separates a previous transaction "n−1" (corresponding to rows 310*a*-324*a*) from a following transaction "n" (corresponding to rows 330*a*-344*a*).

Referring first to transaction "n" of FIG. 3*a*, at row 330*a*, the payload is updated (PL is written to a new page in the NVM). In addition to updating the payload, the metadata can be updated by writing the logical address into the new page in the NVM. Next, at row 332*a*, the TLE descriptor is written to a next entry of GTL 18. The TLE descriptor for the transaction includes the opcode for a page update transaction, and two corresponding parameters, P0 and P1, in which P0 indicates the physical page address for the old page being updated and P1 indicates the physical page address for the new updated page. P0 and P1 correspond to the mapping information for this transaction. (If the metadata of the new page was not updated with the logical address, then the logical address would also be included as part of the TLE descriptor written into GTL 18.) At row 334*a*, a mapping lookup table (LUT) 26 is updated. Mapping LUT 26 (also referred to as a mapping table) may be used by processor 12 to translate logical addresses to physical addresses and can be stored in memory 24 of system 10. At row 336*a*, the transaction is confirmed by toggling the corresponding TLE flag. Rows 330*a* to 336*a* therefore correspond to the update portion (part a) of the transaction. At this point, the transaction is confirmed in GTL 18 (meaning the TLE descriptor is reliably stored) but the transaction has not yet been finalized. That is, the mapping information and MUFs should be persistently stored in NVM 14 as LUT 26 is volatile.

For a page update, the new page must get mapped, and the old page must get unmapped. Therefore, at row 338*a*, the new page is mapped by asserting the corresponding MUF of the new page. Mapping the new page may also include updating the mapping information of the new page with the logical page address (if not previously performed at row 330*a*, prior to toggling the TLE flag). In this case, note that the logical address can be obtained from the TLE descriptor of the LTE. At row 340*a*, the old page is unmapped by clearing (i.e. negating) the corresponding MUF of the old page. At row 342*a*, any other metadata is updated, if needed, in the new page. These mapping steps (and the update of any other metadata, if needed) finalize the transaction such that the mapping information is now stored in the pages NVM 14. Rows 338*a* to 342*a* therefore correspond to the finalization portion (part b) of the transaction.

As the mapping information is backed up in GTL 18 (as P0 and P1), the finalization of the transaction can be repeated if needed, such as upon recovery from a tearing event. However, detecting a tearing event during the updates to the NVM (during part b of the transaction) is not reliably possible without an additional flag to confirm the finalization. For example, if the transaction were instead finalized prior to toggling the TLE flag, the backed-up mapping information in the TLE descriptor would not yet be confirmed, and a tearing event during the finalization portion would result in an inconsistent mapping. Therefore, in the embodiment of FIG. 3*a*, an additional atomic flag (referred to as FINALIZED flag) is needed to confirm the finalization which is asserted in row 344*a*, thus confirming the finalization (part b) of the transaction. (Similarly, for transaction n−1, rows 310*a*-314*a* correspond to part a of the transaction, row 316*a* corresponds to toggling the TLE flag, rows 318*a*-322*a* correspond to part b of the transaction, and the finalization is confirmed by asserting the corresponding FINALIZED flag at row 324*a*.) However, to support the transactions of FIG. 3*a*, GTL 18 would require two atomic flags per entry, which is costly.

FIG. 3*b* illustrates a page update transaction, similar to that of FIG. 3*a*, but without requiring the additional FINALIZATION flags. In FIG. 3*b*, the rows are labeled, from top to bottom, 310*b*-344*b*, in which each row includes a sequential step of the page updating transaction occurring in increasing order of time from top to bottom (in which each row can take different amounts of time, as needed). As described above in reference to FIG. 3*a*, the finalization portion (part b) of a transaction is repeatable once the corresponding TLE flag is toggled by using the backed-up mapping information in the confirmed TLE descriptor. Therefore, it is possible to defer the finalization of a transaction until a next transaction gets started, as this next transaction will utilize a next new entry of GTL 18, thus invalidating the previous entry. By not finalizing the last transaction immediately after toggling the corresponding TLE flag, there will always be one non-finalized but confirmed transaction (i.e. a transaction with a confirmed TLE descriptor whose corresponding TLE flag has been toggled). At boot, the mapping information for creating mapping LUT 26 can be retrieved from NVM 14 for all pages except for the ones which were part of the last transaction interrupted by a tearing event (which are therefore referred to as the exception pages). For these exception pages, the mapping information is obtained from the LTE of GTL 18, corresponding to the last valid GTL entry. The LTE of GTL 18 is determined at boot, by identifying a discontinuity in the TLE flags.

Still referring to FIG. 3*b*, before starting a new transaction n (at row 330*b*), the previous transaction n−1 must first be finalized (by the steps of rows 318*b*-322*b*, corresponding to part b of previous transaction n−1, such that the mapping information as a result of transaction n−1 is persistently stored in the pages of NVM 14). If this transaction is torn, another next transaction (upon reboot or later) will redo the finalization (part b) of previous transaction n−1. If there is no tearing, execution of transaction n continues at rows 330*b*-334*b* (corresponding to part a of transaction n), and confirmation of transaction n is achieved by toggling the corresponding TLE flag (at row 336*b*). Again, the finalization of transaction n (corresponding to rows 338*b*-342*b*) is deferred until a next transaction n+1 is requested. By doing so, the finalization does not need a dedicated confirmation flag, such as the FINALIZED flag of FIG. 3*a*. Instead, as illustrated in FIG. 3*b*, only one single atomic TLE flag protects both the finalization of a preceding transaction as well as the confirmation of the current transaction. That is, the TLE flag of transaction n in FIG. 3*b* both protects finalization of transaction n−1 as well confirms transaction n, unlike the TLE flag of transaction n of FIG. 3*a* which only confirms transaction n, and thus requires the additional FINALIZED flags to protect the finalization of transactions (e.g. of transaction n−1 and n).

During a boot sequence after a tearing event, GTL 18 can be scanned sequentially (e.g. vertically from top to bottom as described above in FIG. 2) through its entries to determine the LTE which identifies the last confirmed (i.e. not torn) transaction. This can be done by detecting a discontinuity in the values (logic states) of the TLE flags as the entries are sequentially scanned. (To speed up the search, other algorithms such as a binary search can be used instead of sequential scanning.) For example, referring back to FIG. 2, if a tearing event occurred during the writing of TR3 to the descriptor portion of log entry 2 (at time 105), then, upon scanning GTL 18, the first discontinuity in the TLE flags is still detected between entry 1 and entry 2. Entry 1 corresponds to the entry of GTL 18 which immediately precedes the discontinuity, and entry 2 corresponds to the entry which immediately follows the discontinuity. In this example, in which the flags were first initialized to zero, the discontinuity corresponds to the TLE flag between entries transitioning from a 1 to a 0. However, since the TLE flags are toggled with each transaction, in the case that all TLE flags have been toggled to 1 (or if they were initialized to 1), then the discontinuity would instead correspond to the TLE flag between entries transitioning from a 0 to a 1.

In this example of FIG. 2, with the tearing event resulting in the discontinuity of the TLE flag occurring between entries 1 and 2, it is known that the LTE corresponds to the current information stored in the TLE descriptor portion of entry 1. As will be described in further detail in the examples below, since it is known that TR2 is confirmed (due to the subsequent toggling of the corresponding TLE flag of entry 1), the descriptor information for TR2 stored in entry 1 is solid and reliable and can be used to identify the correct mapping of the logical address to the appropriate physical address. However, although TR2 is confirmed, TR2 can be finalized at any later time, so long as it occurs before filling the next entry of GTL 18 with a next transaction and toggling the corresponding TLE flag. Therefore, upon finding the discontinuity in the TLE flags between two entries during the scanning of GTL 18, it is known that the first of those two entries (i.e. the entry immediately preceding the discontinuity) is the LTE which accurately reflects the descriptor information for the last transaction. As another example, if the tearing event occurs after toggling of the TLE flag of entry 2 but prior to toggling of the TLE flag of entry 3 (e.g. at time 107 of FIG. 2), then it is known that entry 2 (i.e. the entry immediately preceding the discontinuity) corresponds to the LTE and that current information stored in the TLE descriptor portion of entry 2 describes the last transaction which got confirmed (e.g. TR3 in FIG. 2).

Also, during each boot, after identifying the LTE, the TLE flag of the LTE, as well as the TLE flag in the successor entry to the LTE (i.e. the successor flag), can be strengthened if determined to be week. A tearing event can impact an atomic flag in different ways. In one case, the atomic flag may have already toggled but is still weak. For example, the atomic flag of the LTE may be a weak flag after toggling, thus needing maintenance. In another case, the atomic flag may still be in its old logical state but already weak. For example, the atomic flag of the successor entry may have begun toggling but without success, meaning that the successor flag may also need maintenance. However, by construction, there are only two atomic flags that are checked for maintenance following a power cycle (e.g. during a reboot), which are the atomic flag corresponding to the LTE and the atomic flag corresponding to the successor entry to the LTE, since one of the two may be affected by a power loss. The need to only check and maintain two atomic flags following each power cycle both simplifies the boot process and requires less time as compared to not having GTL 18 and instead using multiple atomic flags for each page of the NVM in which, following each power cycle, each of the multiple atomic flags in each page would need to be checked and potentially strengthened.

Figure 4:
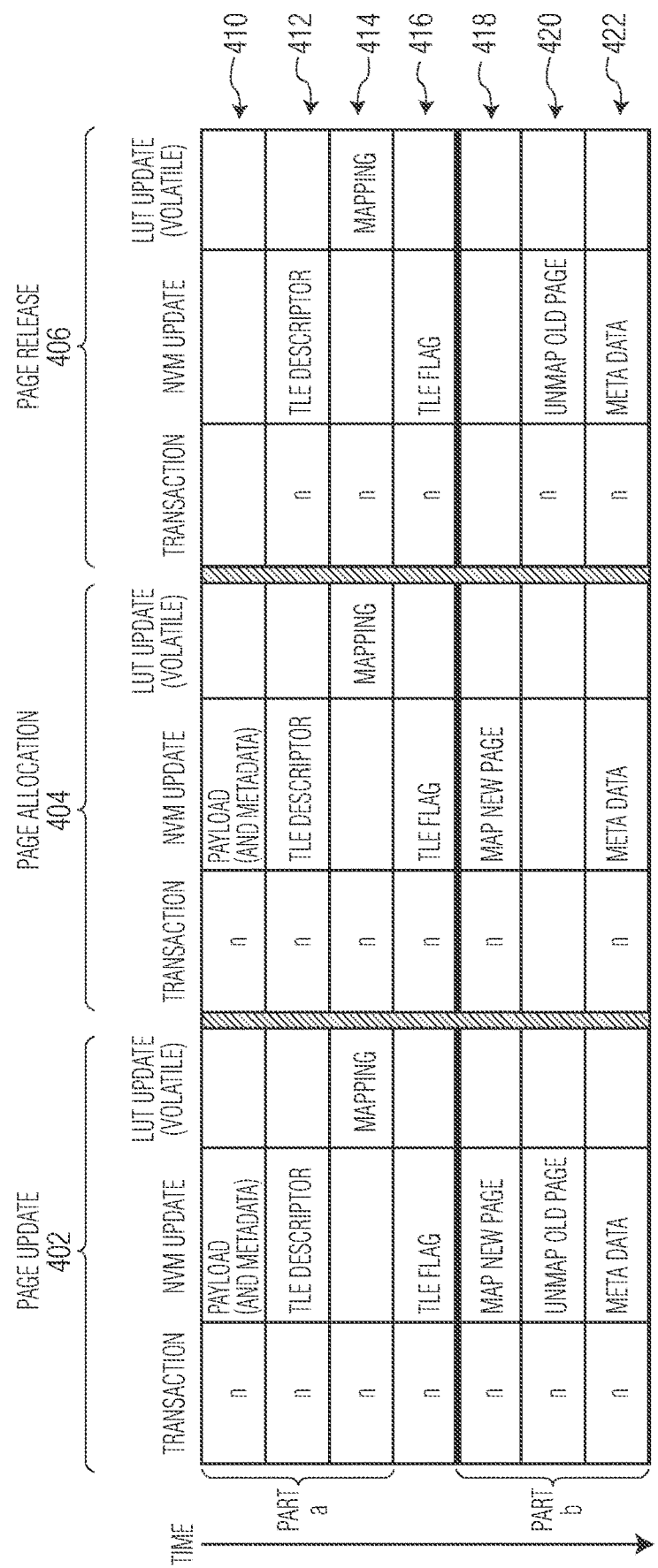
FIG. 4 illustrates, in table form, sequential steps of example page transactions over time.

FIG. 4 illustrates, in table form, example flows for performing various page transactions, including a page update 402, a page allocate 404, and a page release 406, in which each flow illustrates sequential steps of a transaction n in rows 410-422, increasing in time from top to bottom (in which each row can take different amounts of time, as needed). Referring first to page update 402 in the first set of columns of FIG. 4, the steps in rows 410-416 are the same as those illustrated in the lower part (rows 330b-336b) of FIG. 3b. The steps of page update 402 in rows 410-414 correspond to part a of transaction n which are executed directly after finalization of a preceding transaction n−1. The finalization steps of page update 402 in rows 418-422 correspond to part b of transaction n and are deferred until a transaction n+1 is requested.

Referring next to page allocation 404 in the second set of columns of FIG. 4, page allocation 404 can be considered a sub-case of page update 402 in which there is no old/previously mapped page. Therefore, no unmapping is required. In this case, unlike row 420 of page update 402, no "unmap oldpage" is performed for page allocation 404. Similarly, page release 406 in the third set of columns of FIG. 4, is also a sub-case of page update 402 in which there is no new page. Therefore, unlike row 410 of page update 402, no payload update is performed for page release 406. Also, unlike row 418 of page allocate 402, no new mapping information gets written into a page of NVM 14. In this case, note also that the LUT update in row 414 for page release 406 is different in that, instead of replacing the old mapping of the LUT entry with the new mapping, the LUT entry gets invalidated. A newly allocated page (updated with a new payload as in row 410 of page update 402 and page allocation 404) can be any unused (i.e. unmapped) physical page of NVM 14. An old page (the page being unmapped as in row 420 of page update 402 and page release 406) becomes an unused page which can be used in any future transaction.

Figure 5:
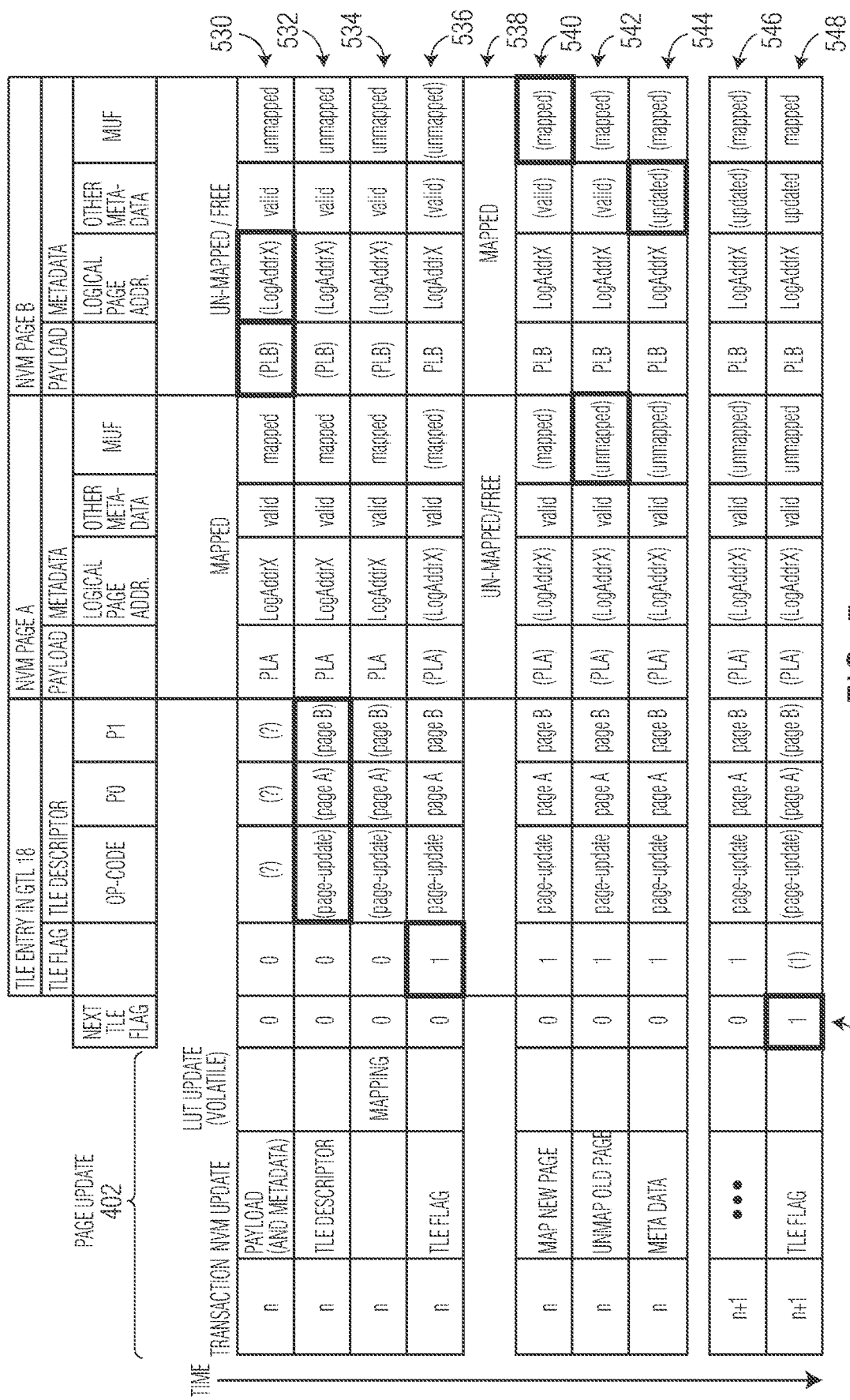
FIG. 5 illustrates, in table form, contents of a GTL entry and physical pages of the NVM over time, in accordance with one embodiment of the present invention.

FIG. 5 illustrates the flow of page update 402 in more detail, in which sequential steps are provided in rows 530-548 in increasing order of time from top to bottom (in which each row can take different amounts of time, as needed). FIG. 5 illustrates page update 402, along with the entry in GTL 18 currently being filled for the page update (transaction n) as well as physical pages A and B of array 16 affected by the page update. The illustrated entry of GTL 18 includes a TLE descriptor portion configured to store the TLE descriptor (including the op-code, P0, and P1) and the corresponding TLE flag. FIG. 5 also illustrates the TLE flag of a next (subsequent) entry to the entry currently being filled, to be filled in with transaction n+1. The illustrated portions of physical pages A and B include a corresponding payload, logical page address, other metadata (if any), and a corresponding MUF (i.e. the non-atomic mapping flag which reflects the state of being mapped). The logical page with the logical page address LogAddrX is located in physical page A (also referred to as NVM page A or simply page A) which includes a payload, referred to as PLA. Due to the page update, the new payload, referred to as PLB, is written to physical page B (also referred to as NVM page B or simply page B). For the example of FIG. 5, it is assumed that the TLE flags for GTL 18 were all initialized to zero, such that upon toggling the TLE flag, the TLE flag is updated to one.

Each row of FIG. 5 reflects the stored data in the current entry of GTL 18, page A, and page B. Bold boxes are used to highlight the update being performed in each row. In FIG. 5, any stored data written within parentheses reflects data which is ignored (regardless of whether the data is valid or invalid) if the transaction n gets torn at the time the update is occurring. That is, parentheses are used to indicate values which are not relevant (in that this information can be lost).

FIG. 5 begins with a starting condition at row 530, in which the logical page is stored in page A (as PLA) with all related metadata (logical page address, other metadata, and MUF) being valid while page B is assumed to be a free (un-mapped) page which is chosen as the target for the updated data. Note that it may still contain valid metadata (e.g. other metadata and MUF). As a first step at row 530, as highlighted by the bold boxes, the new payload gets written to page B as PLB and the logical page address is written to the metadata of page B as LogAddrX. Note that other metadata may also be written to the metadata of page B or kept valid, as illustrated with the column "other metadata" in FIG. 5. The metadata updates may all be considered as an extension of the payload update, in which the metadata can be updated in parallel with the payload or in any sequential order with respect to the payload. If torn, no change to page B will be recognized as page B did not contain any valid/mapped payload and an interrupted update of the payloads or logical addresses gets ignored.

Next, at row 532, the TLE descriptor of a next entry of GTL 18 is programmed with the appropriate op-code for a page update transaction and with the physical page addresses of page A and page B (as P0 and P1, respectively), as highlighted by the bold box. (Note that other metadata may also be stored in this next entry, such as backups of the optional metadata.) Note that this data can be programmed into GTL 18 in any order or in parallel. If torn, the TLE descriptor of this entry will be ignored as the corresponding TLE flag has not yet been toggled. (At row 534, LUT 26 is updated, but no updates occur in GLT 18 or array 16). Next, at row 536, the corresponding TLE flag of this entry being filled is updated (i.e. toggled), which confirms the successful update. While the LUT update is illustrated as occurring at row 534, it can also happen earlier so long as it is done after PLA is successfully written. The LUT update may also occur after the corresponding TLE flag is toggled. As LUT 26 is in volatile memory, it must get recreated after a tearing event regardless. The toggling of the corresponding TLE flag at row 536 validates the TLE descriptor and is the last step of transaction n which is not deferred.

As previously described, in an alternate embodiment, updating the logical address in page B (at row 530) can instead be done later (along with other metadata), after toggling the corresponding TLE flag (at row 536). In this case, this information should be backed up as part of the corresponding TLE descriptor in the TLE entry in GTL 18. However, updating the logical address of page B before toggling the corresponding TLE flag has the advantage that the corresponding TLE descriptor stored in GTL 18 need not include the logical address. This results in less storage space required for each entry of GTL 18 and fewer memory accesses. This is the case for any metadata which is updated in page B prior to toggling the corresponding TLE flag (which confirms this updated metadata in page B), requiring less information to be backed up as part of the corresponding TLE descriptor. Note that in other alternate embodiments, any information in page A, such as "other meta data" of page A, can be treated analogously to the "other meta data" of page B. For example, any or all of the "other meta data" of page A can also be stored in the TLE entry as part of the TLE descriptor such that it is also backed up until finalization is complete with the toggling of the next TLE flag (at row 548). However, storing more information into each TLE entry increases the storage space required for each entry of GTL 18.

Row 538 may correspond to any arbitrary amount of time, and may include any number of reboots (in which reboots may occur for other reasons other than tearing events). Upon a boot, page mappings of NVM 14 for creation of mapping LUT 26 will be derived from the metadata of all pages except the ones marked as exceptions by the TLE descriptor of the LTE (which would be the entry confirmed at row 536). These two pages are handled according to the op-code of the TLE descriptor of the LTE. Therefore, within LUT 26, page B gets mapped and page A does not get mapped. In FIG. 5, this is reflected by removing the parentheses from PLB and adding the parentheses to PLA in line 536 (and the rows below). As both pages were exceptions once the TLE flag was toggled, the other metadata of these two pages (at rows 540-546) is also regarded as no longer being trustworthy and will be updated in the deferred finalization steps of transaction n. A backup of the relevant metadata can instead be retrieved from the TLE descriptor of the LTE.

At rows 540-544, the finalization steps of transaction n are performed. This includes asserting the MUF of page B (row 540), unmapping the old page by clearing the MUF of page A (row 542), and updating the metadata in page B (row 544). These steps can be executed in any order at any time before transaction n+1 is started, and if torn, these steps can all be repeated due to the confirmed data stored in the TLE descriptor of the LTE. In the illustrated embodiment, note that the finalization of a transaction (e.g. rows 540-544) will get initiated when the next transaction n+1 is requested. Only if the finalization succeeds without interruption, the transaction n+1 (with sequential operations illustrated generally in row 546) will reach the TLE flag update (at row 548) in which the TLE flag of the next entry (i.e. successor entry) of GTL 18 is toggled (as illustrated in column 550, corresponding to the TLE flag of the next sequential entry in GTL 18). With the successful update of this next TLE flag, the previous TLE descriptor becomes invalid. Therefore, upon booting after this point, the mapping information of page B and the unmapped information of page A are retrieved from the metadata sections of pages A and B in NVM 14 (for this reason, the parentheses are removed from the appropriate metadata at row 548). Note that in alternate embodiments, no "other metadata" may be present or used in NVM 14, in which case the operation at row 544 is not needed. Also note that in alternate embodiments, the "other metadata" may include LogAddrX, in which case LogAddrX is not written to page B at row 530 with the payload update but is instead updated at row 544 as part of the finalization of transaction n.

In summary, at any time during execution of transaction n, a tearing event may occur in which any of the parenthetical information may be lost or be unreliable. If the tearing event happens before the TLE flag update, the transaction n including the finalization of transaction n−1 are invisible to the system. Once the TLE flag gets updated, though, transaction n is confirmed and valid. The mapping information for the LUT will come from the corresponding TLE descriptor of the LTE until the next transaction n+1 is confirmed (which also confirms a successful finalization of transaction n).

As described above, the allocate and release page transactions can be considered as sub-cases or variants of the page update transaction. Therefore, for each of the allocate and release page transactions, the descriptions provided with respect to the appropriate portions of the page allocate transaction illustrated FIG. 5 also apply to the allocate or release page transactions. Note also that additional op-codes for other page transactions can also be used. For example, a "no-operation" transaction can be useful after initialization of GTL 18, when no previous transaction exists, no page is indicated as an exception (i.e. as exception pages), and no finalization step is needed.

For clarity in the description of the page update as transaction n in FIG. 5, the finalization steps (rows 540-544) are drawn as belonging to transaction n but will get executed as the initial steps of any next transaction n+1. In the illustrated embodiment, after both MUFs are updated for transaction n (in rows 540 and 542), transaction n+1 is received, as reflected at row 546. At this point, the descriptor is stored into the descriptor portion of a next entry (not illustrated in FIG. 5) of GTL 18. This includes writing the opcode for the "next transaction entry" and, if needed, information into P0 and P1. Once writing of the descriptor into the next entry of GTL 18 is completed, the TLE flag for transaction n+1 is toggled (here, to a logic level 1), as reflected at row 548 in column 550. At this point, previous transaction n is considered finalized, in which any subsequent tearing event during the execution of transaction n+1 would not result in re-executing any part of transaction n, but would result in re-executing parts of transaction n+1 using information stored in the corresponding confirmed descriptor portion stored in GTL 18. Also, upon completion (i.e. closing) of transaction n, it is known that the relevant data and metadata (including the mapping info and MUFs) in pages A and B are all valid.

Note that, in the above embodiments, the operations of each page transaction, including updating GTL 18, can be performed by controller 20 or by processor 12. Similarly, the scanning and searching for the discontinuity to identify the LTE can also be performed by controller 20 or processor 12.

Figure 6:
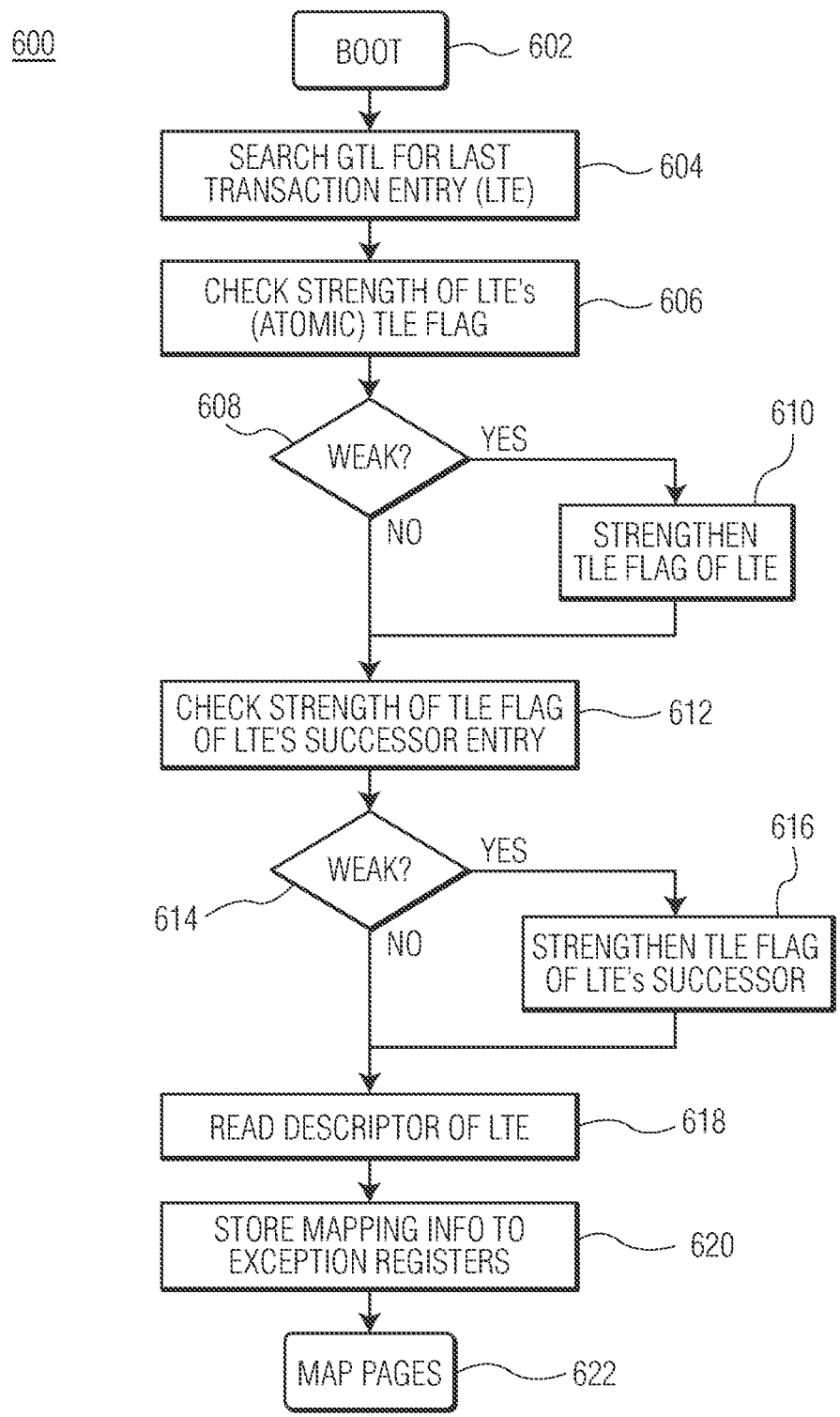
FIG. 6 illustrates, in flow diagram form, a method of using the GTL, in accordance with one embodiment of the present invention.

FIG. 6 illustrates, in flow diagram form, a method 600 of using GTL 18 upon a boot of system 10, in accordance with one embodiment of the present invention. At boot (602) of system 10, method 600 begins with a search (604) of GTL 18 to identify the last valid transaction entry (i.e. LTE). This can be a boot upon power up, such as after a tearing event. The search identifies the LTE by finding a discontinuity in the TLE flags as sequentially scanned, as described in the example of FIG. 2 above. For example, GTL 18 can be scanned sequentially to detect the discontinuity. In another embodiment, a binary search may be implemented to find the discontinuity. When the discontinuity is found, the last entry of GTL 18, just before the discontinuity, is identified as the LTE (in which the TLE flag of the LTE and the TLE flag of the next entry immediately sequential to the LTE store opposite logic states). In one embodiment, in the case where all TLE flags are identical and no discontinuity exists (such as after initialization or when writing the last TLE flag before inverting the toggling to the opposite direction), the last entry of GTL 18 can be identified as the LTE. In the case of a tearing event, the LTE corresponds to the transaction which was confirmed but not yet finalized when the tearing event occurred.

Once the TLE is identified, the strength of the TLE flag of the LTE is checked (606). If, at decision diamond 608, it is determined to be weak, it is strengthened (610) to make it reliable before continuing. After strengthening, or if it was not determined to be weak, the strength of the TLE flag of the next (i.e. successor) entry is checked (612). If, at decision diamond 614, it is determined to be weak, it is strengthened (616). The TLE flag of the successor entry is also checked and conditionally strengthened because a transaction might be torn while toggling the TLE flag of the successor entry, in which this TLE flag might become weak but not fully toggled and thus be undetected. Note that the checking and conditionally strengthening is performed on only two atomic flags at boot as compared to other solutions which utilize atomic flags for each page which require, upon any boot, maintenance of all atomic flags. In this case, all atomic flags are scanned to determine which are weak and thus need strengthening, which requires far more time upon boot.

After eventual strengthening of the two flags which might be weak, the descriptor of the LTE is read (618) to identify any exception pages. As described above, since the atomic TLE flag of the LTE was toggled (and thus resulted in the detected discontinuity of block 604), it is known that the corresponding descriptor information in the LTE of GTL 18 is secure and can be relied upon as being correct. Therefore, using the information of the descriptor, the mapping information can be obtained (such as from parameters P0 and P1, which identify old and new physical addresses, for the corresponding operation). This mapping information for any exception pages (e.g. physical page address and mapping status) determined from the LTE of GTL 18 (rather than determined based on any MUFs of the physical pages which are potentially unreliable) is stored into a set of exception registers 22 (620). For example, one register of exception registers 22 can store the physical address for a mapped page, and another register of exception registers 22 can store the physical address for an unmapped page (in which the mapped and unmapped pages can be determined from the descriptor of the LTE, as described above in reference to the example page transaction of FIG. 4). Further, in the embodiments where the logical address is also stored as part of the TLE descriptor for a transaction, the logical address for a mapped page can also be obtained from the descriptor of the LTE and stored in exception registers 22. After the mapping information for the exception pages is stored, all pages of the NVM can be properly mapped (622) using the exception registers, as needed.

Note that other information, in addition to the physical addresses, may be stored in exception registers 22. For example, this information may be additional information obtained from the descriptor, such as the logical address or other additional information. Also, in alternate embodiments, the exception registers can be expanded to include additional exception registers for multiple page transactions. The set of exception registers 22 can include any number of registers (i.e. one or more), can be any type of storage circuitry (e.g. volatile storage circuitry), and may be organized differently. They may also be located outside of NVM 14. Also, the strengthening of the atomic flags (at 610 and 616) can be performed at a later time, but before a next transaction is performed.

Figure 7:
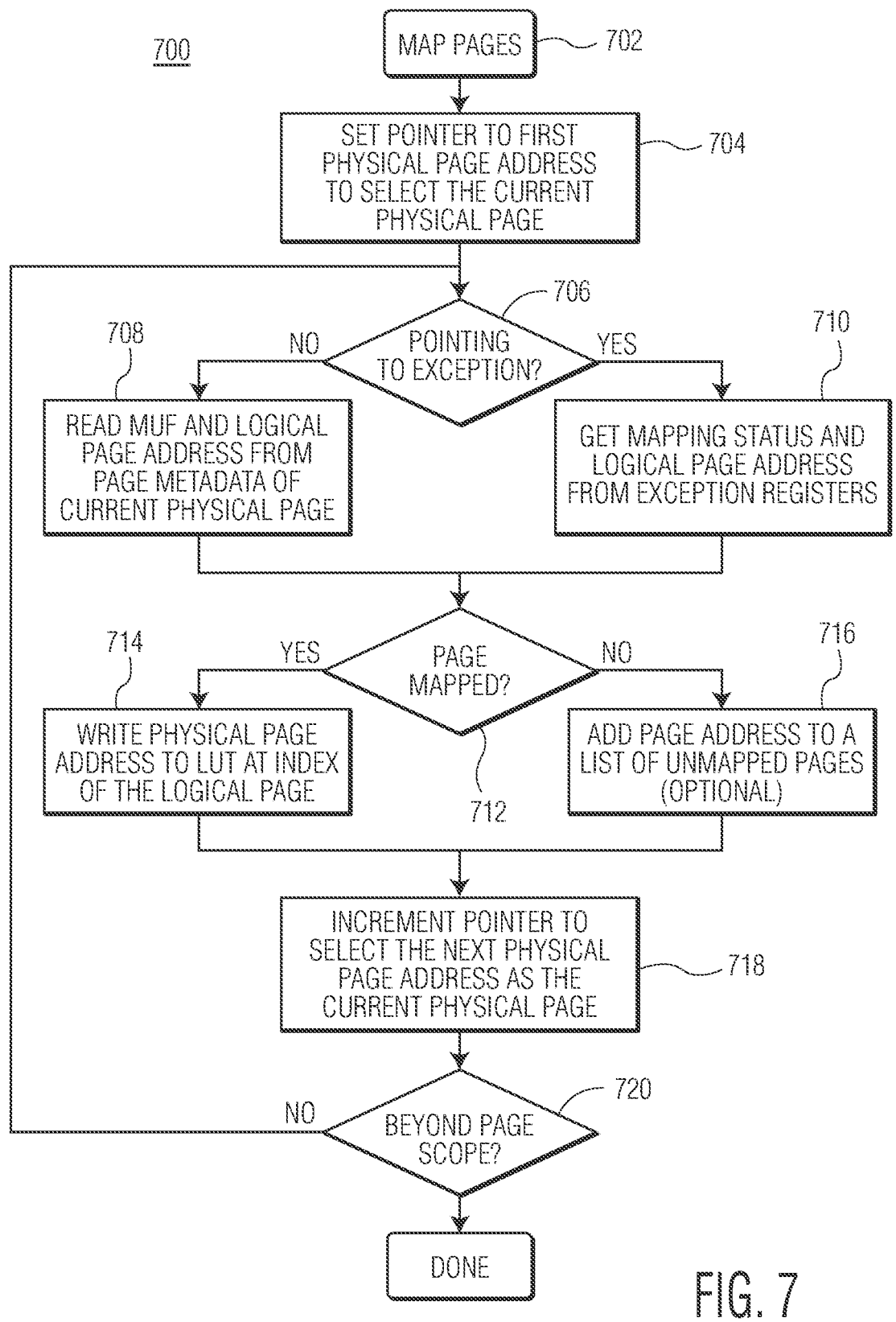
FIG. 7 illustrates, in flow diagram form, a mapping operation in accordance with one embodiment of the present invention.

FIG. 7 illustrates, in flow diagram form, a method 700 for performing a mapping operation using exception registers 22, in accordance with one embodiment of the present invention. The mapping operation builds mapping LUT 26 with the current mappings of physical pages in NVM 14, which may then be used by system 10 (e.g. processor 12) to properly access NVM 14. (This mapping operation may correspond to the mapping performed at block 622 of FIG. 6.) The mapping information for building mapping LUT 26 is obtained by iteratively progressing through all physical NVM pages and mapping the pages according to the metadata stored within NVM 14. However, for the exception pages (stored in exception registers 22), the metadata is not trustworthy and is therefore replaced by the data stored in exception registers 22. In this manner, the obtained mapping information is trustworthy, and the page can be mapped with a proper entry in mapping LUT 26 (or skipped and possibly included in a list of free/unused pages).

Method 700 begins by setting a pointer to a first physical page address of NVM 14 to select this first physical page as the current physical page to be processed (704). At decision diamond 706, it is determined whether the physical page address of the current physical page is one of the physical addresses stored within exception registers 22. If not, then the MUF and logical page address are read from the metadata of the current physical page (708). If so, then the mapping status (i.e. whether mapped or unmapped) is instead obtained from exception registers 22 (710). (In this case, the logical page address can either be obtained from the exception registers 22 (if stored there) or from the metadata of the current physical page, depending on how logical address updates are handled while performing page transactions.) At decision diamond 712, it is determined whether or not the current physical page corresponds to a mapped page (as determined from the MUF read from the current physical page or the mapping status read from the exception registers). If so, the physical page address of the current physical page is written to mapping LUT 26 at an index determined by the corresponding logical page address (which was read from the current physical page or from the exception registers). If not, then no update is performed to mapping LUT 26 and, if available, the page address of the current physical page can be added to a list of unmapped pages (716). Next, to iteratively process the next physical page, the pointer is incremented to select the next physical page address as the current physical page (718). If, at decision diamond 720, the incremented pointer exceeds the page scope (e.g. exceeds beyond the last page of NVM 14), the mapping operation is done. If not, then method 700 returns to decision diamond 706 to continue processing the next physical page (which now corresponds to the current physical page).

Therefore, by now it can be appreciated how the use of a global transaction log, with one atomic flag per entry, provides a mechanism to reliably discriminate between old and new information belonging to the same logic memory block. Even upon occurrence of a tearing event, the global transaction log and atomic flag allow for proper recovery upon boot in which a reliable mapping of all logical addresses is maintained. Each block of memory (such as each page) may still include a non-atomic flag to indicate the mapping status of the page, but a tearing event which causes this mapping status to become invalid or untrustworthy will not result in the loss of this information as it is backed up by the last valid entry (e.g. LTE) of the global transaction log. Further, the use of an atomic flag per GTL entry prevents the need to have an atomic flag for each memory block or page. The global transaction log provides tearing protection by allowing for the efficient identification of the LTE (e.g. the entry representing the last transaction which was confirmed but not finalized when the tearing event occurred). The information from this LTE can then be used to obtain accurate mapping information for the affected pages, without needing to rely on any mapping flag (e.g. MUF) within the metadata for each potentially torn memory block or page. Also, by limiting the number of required atomic flags, area, power, and time savings may be achievable.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of system 10 are circuitry located on a single integrated circuit (e.g. an SoC) or within a same device. Alternatively, system 10 may include any number of separate integrated circuits or separate devices interconnected with each other. For example, memory 14 may be located on a same integrated circuit as processor 12 or on a separate integrated circuit or located within another peripheral or slave discretely separate from other elements of system 10.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the number of entries within the global transaction log can vary for different applications, based, for example, on the size of the memory and the desired endurance for each log entry. Also, controller 20 (i.e. control circuitry 20) can be implemented with any type or combination of circuitry, including logic circuits, circuitry executing software, etc. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention. Note that any of the aspects below can be used in any combination with each other and with any of the disclosed embodiments.

In one embodiment, a non-volatile memory (NVM) system includes a memory array divided into physical pages, each physical page configured to store a corresponding payload and corresponding metadata for the physical page; control circuitry; and a global transaction log (GTL) having a plurality of entries, wherein each entry is configured to store a transaction descriptor identifying a transaction and a corresponding physical page used by the transaction, each entry having a corresponding transaction log entry (TLE) flag. The control circuitry is configured to populate the entries of the GTL in sequential order with each new transaction, and, in response to completing storing the transaction descriptor for a new transaction, program the corresponding TLE flag by toggling its logic state. In one aspect, the transaction descriptor includes an opcode identifying a type of memory transaction and a physical page address identifying the physical page. In a further aspect, the type of memory transaction includes a type selected from a group consisting of a page update transaction, an allocate page transaction, and a release page transaction. In yet a further aspect, when the opcode of the transaction descriptor identifies the type of memory transaction as the page update transaction, the transaction descriptor includes a first physical page address for identifying a physical page with old information and a second physical page address for identifying a physical page with new information. In another aspect of the embodiment, during a boot of the memory system after a power loss, the control circuitry is configured to scan the GTL to find a discontinuity in logic state of the TLE flags to identify a last translation entry (LTE) which corresponds to an entry of the GTL which, in accordance with the sequential order, immediately precedes the discontinuity. In a further aspect, the TLE flag corresponding to the LTE has a different logic state from a successor entry of the GTL which, in accordance with the sequential order, immediately follows the discontinuity. In yet a further aspect, each TLE flag is implemented as an atomic flag, and the corresponding transaction descriptor of the LTE identifies a latest transaction whose corresponding transaction descriptor was confirmed as reliably stored in the GTL prior to the power loss. In yet a further aspect, during the boot of the memory system, the control circuitry is further configured to, after identifying the LTE, identify any physical pages used by the latest transaction as exception pages, and store mapping information for the exception pages into a set of exception registers. In yet an even further aspect, the corresponding metadata for each physical page is configured to store a logical address for the physical page and a non-atomic mapping flag to indicate whether the physical page is mapped or unmapped to the logical address. In yet an even further aspect, during the boot of the memory system, the control circuitry is further configured to create a mapping table configured to store associated mapping information for each mapped physical page of the array by using either metadata corresponding to the mapped physical page or the set of exception registers to obtain the associated mapping information. In another even further aspect, during the boot of the memory system, the control circuitry is further configured to create the mapping table by iteratively progressing through each physical page address of the array, wherein, for each physical page address, if the physical page address corresponds to an identified exception page, obtaining a mapping status from the set of exception registers, else obtaining the mapping status from the non-atomic mapping flag of the corresponding metadata for the physical page address, wherein the mapping status indicates whether the physical page address is mapped or unmapped; and, for each mapped physical page address, store mapping information for the physical page address into the mapping table. In another aspect, the control circuitry is further configured to strengthen the TLE flag corresponding to the LTE in response to determining that the TLE flag corresponding to the LTE is weakly programmed; and strengthen the TLE flag corresponding to the successor entry in response to determining that the TLE flag corresponding to the successor entry is weakly programmed.

In another embodiment, a non-volatile memory (NVM) system includes a memory array divided into physical pages, each physical page configured to store a corresponding payload and corresponding metadata for the physical page; control circuitry; and a global transaction log (GTL) having a plurality of entries, wherein each entry is configured to store a transaction descriptor identifying a page transaction and a physical page used by the page update transaction, each entry having a corresponding transaction log entry (TLE) flag, each corresponding TLE flag implemented as an atomic flag. In the another embodiment, the control circuitry is configured to populate a next entry of the GTL, in a sequential order, with a new page transaction, after completing storing the transaction descriptor for the new page transaction into the next entry, confirm the new page transaction by toggling a logic state of the corresponding TLE flag, and when a next page transaction subsequent to the new page transaction is received, finalize the new page transaction. In one aspect, the corresponding metadata for each physical page is configured to store a logical address for the physical page and a non-atomic mapping flag to indicate whether the physical page is mapped to the logical address or is unmapped. In a further aspect, during a boot of the memory system after a power loss, the control circuitry is configured to scan the GTL to find a discontinuity in logic state of the TLE flag to identify a last translation entry (LTE) which corresponds to an entry of the GTL which immediately precedes the discontinuity and whose transaction descriptor identifies a latest transaction which was confirmed in the GTL prior to the power loss, but was not yet finalized. In yet a further aspect, during the boot of the memory system, the control circuitry is further configured to, after identifying the LTE, identify any physical pages used by the latest transaction as exception pages, and storing mapping information for the exception pages into a set of exception registers. In yet a further aspect, during the boot of the memory system, the control circuitry is further configured to create a mapping table by iteratively progressing through each physical page address of the array, wherein, for each physical page address, if the physical page address is identified as an exception page, obtaining a mapping status from the set of exception registers, else obtaining the mapping status from the non-atomic mapping flag of the corresponding metadata for the physical page address, wherein the mapping status indicates whether the physical page address is for a mapped page or an unmapped page, and, for each mapped physical page address, store mapping information for the physical page address into the mapping table. In yet a further aspect, the control circuitry is further configured to strengthen the TLE flag corresponding to the LTE in response to determining that the TLE flag corresponding to the LTE is weakly programmed; and strengthen the TLE flag corresponding to the successor entry in response to determining that the TLE flag corresponding to the successor entry is weakly programmed. In another aspect of the another embodiment, when the transaction descriptor of the new page transaction identifies a page update transaction which updates a logical page mapping from an old physical page of the memory array to a new physical page of the memory array, the control circuitry is configured to finalize the new page transaction by updating the non-atomic mapping flag of the corresponding metadata of the new physical page identified by the transaction descriptor of the new page transaction, and updating the non-atomic mapping flag of the corresponding metadata of the old physical page identified by the transaction descriptor of the old page transaction. In yet another aspect, the control circuitry is configured to, after each entry of the GTL has been populated, rolling back to a beginning entry of the GTL.

What is claimed is:

1. A non-volatile memory (NVM) system, comprising:
   a memory array divided into physical pages, each physical page configured to store a corresponding payload and corresponding metadata for the physical page;
   control circuitry; and
   a global transaction log (GTL) having a plurality of entries, wherein each entry is configured to store a transaction descriptor identifying a transaction and a corresponding physical page used by the transaction, each entry having a corresponding transaction log entry (TLE) flag, wherein the control circuitry is configured to:
      populate the entries of the GTL in sequential order with each new transaction, and
      in response to completing storing the transaction descriptor for a new transaction, program the corresponding TLE flag by toggling its logic states
      wherein the transaction descriptor includes an opcode identifying a type of memory transaction and a physical page address identifying the physical page, and when the opcode of the transaction descriptor identifies the type of memory transaction as a page update transaction, the transaction descriptor includes a first physical page address for identifying a physical page with old information and a second physical page address for identifying a physical page with new information.

2. The NVM system of claim 1, wherein, during a boot of the memory system after a power loss, the control circuitry is configured to scan the GTL to find a discontinuity in logic state of the TLE flags to identify a last translation entry (LTE) which corresponds to an entry of the GTL which, in accordance with the sequential order, immediately precedes the discontinuity.

3. The NVM system of claim 2, wherein the TLE flag corresponding to the LTE has a different logic state from a successor entry of the GTL which, in accordance with the sequential order, immediately follows the discontinuity.

4. The NVM system of claim 3, wherein each TLE flag is implemented as an atomic flag, and the corresponding transaction descriptor of the LTE identifies a latest transaction whose corresponding transaction descriptor was confirmed as reliably stored in the GTL prior to the power loss.

5. The NVM system of claim 3, wherein the control circuitry is further configured to:
   strengthen the TLE flag corresponding to the LTE in response to determining that the TLE flag corresponding to the LTE is weakly programmed; and
   strengthen the TLE flag corresponding to the successor entry in response to determining that the TLE flag corresponding to the successor entry is weakly programmed.

6. A non-volatile memory (NVM) system, comprising:
   a memory array divided into physical pages, each physical page configured to store a corresponding payload and corresponding metadata for the physical page;
   control circuitry; and
   a global transaction log (GTL) having a plurality of entries, wherein each entry is configured to store a transaction descriptor identifying a transaction and a corresponding physical page used by the transaction, each entry having a corresponding transaction log entry (TLE) flag, wherein the control circuitry is configured to:
      populate the entries of the GTL in sequential order with each new transaction, and
      in response to completing storing the transaction descriptor for a new transaction, program the corresponding TLE flag by toggling its logic state,
   wherein, during the boot of the memory system after a power loss, the control circuitry is further configured to:
      scan the GTL to find a discontinuity in logic state of the TLE flags to identify a last translation entry (LTE) which corresponds to an entry of the GTL which, in accordance with the sequential order, immediately precedes the discontinuity, wherein the TLE flag corresponding to the LTE has a different logic state from a successor entry of the GTL which, in accordance with the sequential order, immediately follows the discontinuity, and each TLE flag is implemented as an atomic flag, and the corresponding transaction descriptor of the LTE identifies a latest transaction whose corresponding transaction descriptor was confirmed as reliably stored in the GTL prior to the power loss, and
      after identifying the LTE:
         identify any physical pages used by the latest transaction as exception pages, and
         store mapping information for the exception pages into a set of exception registers.

7. The NVM system of claim 6, wherein the corresponding metadata for each physical page is configured to store a logical address for the physical page and a non-atomic mapping flag to indicate whether the physical page is mapped or unmapped to the logical address.

8. The NVM system of claim 7, wherein, during the boot of the memory system, the control circuitry is further configured to create a mapping table configured to store associated mapping information for each mapped physical page of the array by using either metadata corresponding to the mapped physical page or the set of exception registers to obtain the associated mapping information.

9. The NVM system of claim 7, wherein, during the boot of the memory system, the control circuitry is further configured to:
   create the mapping table by iteratively progressing through each physical page address of the array, wherein, for each physical page address, if the physical page address corresponds to an identified exception page, obtaining a mapping status from the set of exception registers, else obtaining the mapping status from the non-atomic mapping flag of the corresponding metadata for the physical page address, wherein the mapping status indicates whether the physical page address is mapped or unmapped; and for each mapped physical page address, store mapping information for the physical page address into the mapping table.

10. A non-volatile memory (NVM) system, comprising:
a memory array divided into physical pages, each physical page configured to store a corresponding payload and corresponding metadata for the physical page;
control circuitry; and
a global transaction log (GTL) having a plurality of entries, wherein each entry is configured to store a transaction descriptor identifying a page transaction and a physical page used by the page transaction, each entry having a corresponding transaction log entry (TLE) flag, each corresponding TLE flag implemented as an atomic flag, wherein the control circuitry is configured to:
  populate a next entry of the GTL, in a sequential order, with a new page transaction,
  after completing storing the transaction descriptor for the new page transaction into the next entry, confirm the new page transaction by toggling a logic state of the corresponding TLE flag, and
  when a next page transaction subsequent to the new page transaction is received, finalize the new page transaction,
wherein the corresponding metadata for each physical page is configured to store a logical address for the physical page and a non-atomic mapping flag to indicate whether the physical page is mapped to the logical address or is unmapped,
wherein when the transaction descriptor of the new page transaction identifies a page update transaction which updates a logical page mapping from an old physical page of the memory array to a new physical page of the memory array, the control circuitry is configured to finalize the new page transaction by:
  updating the non-atomic mapping flag of the corresponding metadata of the new physical page identified by the transaction descriptor of the new page transaction, and
  updating the non-atomic mapping flag of the corresponding metadata of the old physical page identified by the transaction descriptor of the old page transaction.

11. The NVM system of claim 10, wherein, during a boot of the memory system after a power loss, the control circuitry is configured to scan the GTL to find a discontinuity in logic state of the TLE flag to identify a last translation entry (LTE) which corresponds to an entry of the GTL which immediately precedes the discontinuity and whose transaction descriptor identifies a latest transaction which was confirmed in the GTL prior to the power loss, but was not yet finalized.

12. The NVM system of claim 10, wherein the control circuitry is configured to, after each entry of the GTL has been populated, rolling back to a beginning entry of the GTL.

13. A non-volatile memory (NVM) system, comprising:
a memory array divided into physical pages, each physical page configured to store a corresponding payload and corresponding metadata for the physical page;
control circuitry; and
a global transaction log (GTL) having a plurality of entries, wherein each entry is configured to store a transaction descriptor identifying a page transaction and a physical page used by the page transaction, each entry having a corresponding transaction log entry (TLE) flag, each corresponding TLE flag implemented as an atomic flag, wherein the control circuitry is configured to:
  populate a next entry of the GTL, in a sequential order, with a new page transaction,
  after completing storing the transaction descriptor for the new page transaction into the next entry, confirm the new page transaction by toggling a logic state of the corresponding TLE flag, and
  when a next page transaction subsequent to the new page transaction is received, finalize the new page transaction,
wherein the corresponding metadata for each physical page is configured to store a logical address for the physical page and a non-atomic mapping flag to indicate whether the physical page is mapped to the logical address or is unmapped,
wherein, during a boot of the memory system after a power loss, the control circuitry is configured to scan the GTL to find a discontinuity in logic state of the TLE flag to identify a last translation entry (LTE) which corresponds to an entry of the GTL which immediately precedes the discontinuity and whose transaction descriptor identifies a latest transaction which was confirmed in the GTL prior to the power loss, but was not yet finalized, and
wherein, during the boot of the memory system, the control circuitry is further configured to, after identifying the LTE:
  identify any physical pages used by the latest transaction as exception pages, and
  storing mapping information for the exception pages into a set of exception registers.

14. The NVM system of claim 13, wherein, during the boot of the memory system, the control circuitry is further configured to:
create a mapping table by iteratively progressing through each physical page address of the array, wherein, for each physical page address, if the physical page address is identified as an exception page, obtaining a mapping status from the set of exception registers, else obtaining the mapping status from the non-atomic mapping flag of the corresponding metadata for the physical page address, wherein the mapping status indicates whether the physical page address is for a mapped page or an unmapped page, and
for each mapped physical page address, store mapping information for the physical page address into the mapping table.

15. The NVM system of claim 14, wherein the control circuitry is further configured to:
strengthen the TLE flag corresponding to the LTE in response to determining that the TLE flag corresponding to the LTE is weakly programmed; and
strengthen the TLE flag corresponding to the successor entry in response to determining that the TLE flag corresponding to the successor entry is weakly programmed.

16. The NVM system of claim 13, wherein the control circuitry is configured to, after each entry of the GTL has been populated, rolling back to a beginning entry of the GTL.

\* \* \* \* \*